United States Patent Office 2,916,001
Patented Dec. 8, 1959

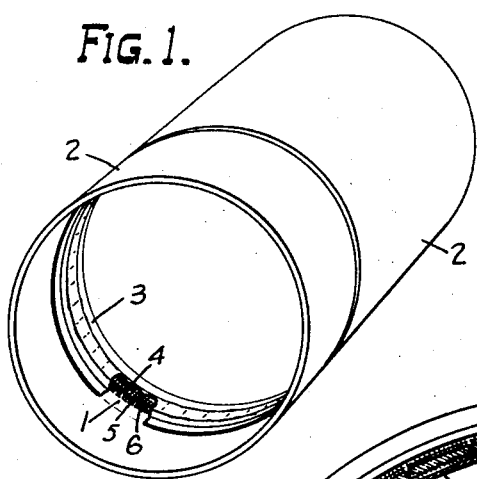
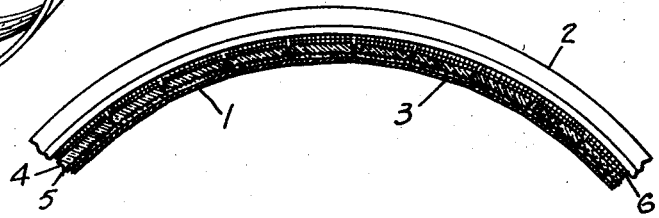
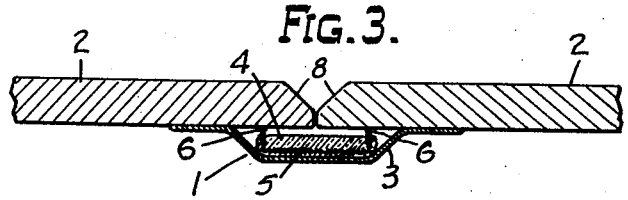
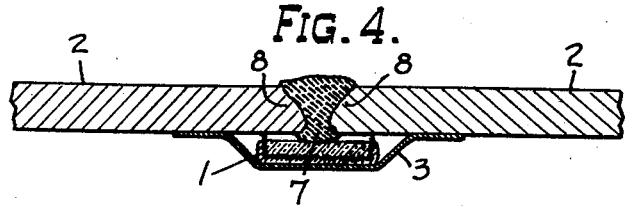
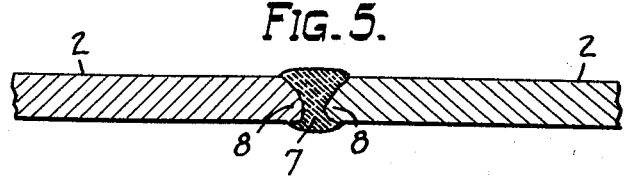

2,916,001

CERAMIC WELDING BACK-UP STRIP AND METHOD OF APPLYING THE SAME

John J. Chyle and Michael W. Zimmermann, Milwaukee, Wis., assignors to A. O. Smith Corporation, Milwaukee, Wis., a corporation of New York Application March 19, 1954, Serial No. 417,390

7 Claims. (Cl. 113—111)

This invention relates to welding and more particularly to a welding back-up apparatus for supporting and forming molten weld metal during welding of a seam between the opposed edges of two metal articles.

Ceramic or refractory materials are frequently employed as a backing material to be applied to the underside of a seam between the opposed edges of two metal articles. The ceramic backing material serves to insulate the weld, support the molten weld metal and form the underbead. In the past the use of ceramic back-up materials have had several distinct limitations. As the ceramic material is used in a powdered form or in a strip form which is extremely brittle, the use of the ceramic material has been restricted to flat surfaces for the material cannot successfully be applied to curved surfaces, such as the girth weld of two tubular members. In addition, a ceramic or refractory material will usually shatter when subjected to the heat of the molten weld metal and the shattered ceramic material is difficult to remove after the welding operation.

The present invention is directed to a welding backing strip formed of a ceramic band or layer which can be applied to curved as well as flat surfaces and which will remain an integral structure after welding so as to facilitate removal of the strip from the welded articles.

According to the present invention the backing apparatus comprises a band or layer of ceramic material which is extruded onto a strip of wire mesh having upturned side edges. The backing apparatus is adapted to be applied to the underside of a seam between the adjacent opposed edges of two metal articles to be welded and serves to support and form the molten weld metal during welding. The upturned side edges of the mesh bear against the articles and serve to space the ceramic material from the seam and provide a convex underbead.

When applied to a girth seam between tubular articles, the ceramic material is broken at intervals throughout its length to permit the ceramic to conform to the contour of the articles. The wire mesh serves to interconnect the broken segments of the ceramic band and maintains alignment of the same.

The ceramic material serves to effectively insulate the welding area and eliminates the necessity of using a metallic chill to dissipate the heat of welding.

The present backing apparatus may be applied to surfaces of any contour, and because of the wire mesh, will remain as an integral structure throughout welding so that the backing apparatus may be removed as one piece after welding.

The drawing furnished herewith illustrates the best mode presently contemplated and set forth hereinafter of carrying out the invention.

In the drawing:

Figure 1 is a perspective view of two abutting pipe sections with the backing strip in place;

Fig. 2 is an enlarged fragmentary vertical transverse section taken at the seam of the pair of pipe sections shown in Figure 1;

Fig. 3 is an enlarged fragmentary longitudinal section of the seam and the backing strip before welding;

Fig. 4 is a view similar to Fig. 3 after the welding operation; and

Fig. 5 is a view similar to Fig. 4 after the backing strip has been removed.

Referring to the drawing there is shown a backing strip 1 to be applied to the underside of a seam between the adjacent ends of two metal articles 2 to be welded together. The backing strip serves to support the molten weld metal and form the underbead. When the backing strip 1 is to be employed with tubular members, as shown in the drawing, the strip is in the shape of a ring.

The backing strip 1 is supported beneath the seam by any conventional means. As shown in the drawing, a pressure sensitive, heat-resistant glass fabric adhesive tape 3 extends across the back of the strip 1 and is applied to the articles 2 on either side of the strip. Mechanical expansion means may also be employed in place of the tape 3, if desired, to hold the backing strip 1 in position against the articles 2.

The backing strip 1 comprises a thin layer or band of a ceramic or refractory insulating material 4 which is extruded or otherwise applied to a wire mesh 5 or lattice.

The ceramic material 4 may be formed of any of the common types of high melting point ceramic materials which will not react or decompose to give off gases or give up water of hydration as vapor when heated to elevated temperatures during welding. In addition, the ceramic material 4 should not contain components which will alloy with the weld metal to produce undesirable properties in the weld.

The following composition has proven particularly satisfactory for use as the ceramic layer 4:

| | Parts |
|---|---|
| $Al_2O_3$ | 80–120 |
| $ZrO_2$ | 40–60 |
| $Na_2SiO_3$ | 80–120 |

In addition to the above composition, other materials such as Wollastonite, Dolomite, glass, fused alumina or magnesia may also be employed as the ceramic material 4. With the use of some of these materials as the layer 4, it may be desirable to use a binding agent, such as sodium silicate, to bond the material together so that the ceramic will be in the form of an integral strip or band. If the ceramic material has sufficient cohesive properties, the binding agent need not be employed.

If the ceramic material, after being extruded on the mesh 5 and soldifying, contains moisture, the ceramic should be baked to complete dryness to drive off the moisture or combined water so that water vapor will not be given off during welding as the ceramic is heated.

When the backing strip is employed with tubular members, as shown in the drawing, the ceramic material 4 is broken transversely at various intervals throughout its length to provide a series of small segments juxtaposed in a generally end-to-end relation. By this construction the strip is able to conform to the general curvature of the tubular members 2. The length of the broken segments should be comparatively small so that the gap between the segments when the layer 4 is in circular form will be maintained at a minimum.

The side edges 6 of wire mesh 5 are bent generally perpendicularly to the central web of the mesh so that the mesh is generally channel-shaped in cross section.

The ceramic material is extruded or otherwise applied to the mesh in a molten or liquid form so that the ceramic will ooze through the openings in the mesh and on solidifying of the ceramic the mesh will be embedded therein. The side edges or flanges 6 of the mesh serve to retain the molten ceramic so that the ceramic defines a strip form.

If a convex underbead is desired, the side edges 6 may project outwardly beyond the supporting surface of the ceramic, as shown in Figs. 2 and 3. By this construction the projecting edges of sides 6 bear against pipe sections 2 and space the ceramic from the sections so that the molten weld metal may flow into the space and form into a convex underbead. Alternately, the ceramic material may be disposed directly in contact with the articles or pipe sections 2 if a concave underbead is desired.

If the backing strip is to be applied to tubular members, as shown in the drawings, the sides 6 of mesh 5 may be cut or slit at spaced intervals to facilitate the bending of the mesh to a circular shape.

The wire mesh 6 serves to interconnect the broken segments of the ceramic material 5 and maintains the segments in alignment during welding. As the segments are connected by the mesh, the strip can be readily removed in one piece from pipe sections 2 after welding. This feature eliminates the clean-up operations usually associated with the use of the ordinary ceramic back-up which is shattered by the heat of welding into a great number of small pieces and which must be individually removed from the pipe sections or other articles after welding.

The backing strip is fabricated by initially mixing the ingredients of the ceramic material with water and a silicate binder, if necessary, to form a material of paste-like consistency.

The material 4 is then extruded on the mesh 5 and permitted to harden. After hardening, the backing strip is heated to an elevated temperature to drive off any moisture that may remain in the ceramic material.

After baking, the strip is bent to the contour of the pipe sections 2 with the ceramic material breaking into a plurality of small segments. The strip is then applied to the underside of the seam between the pipe sections and secured thereto by the pressure sensitive tape 3.

The backing strip 1 is aligned beneath the seam between the opposed edges of the pipe sections 2 as best seen in Figs. 2 and 3. The outer or supporting surface of the ceramic material 4 is generally flat in a transverse plane and serves to support and form the weld metal. During welding, the molten weld metal 7 flows between the lips 8 of the opposed pipe sections 2 and contacts the ceramic material 4, fusing the ceramic and enabling the weld metal to be formed into a smooth-surfaced underbead.

The ceramic layer 4 serves primarily as an insulating medium and reduces the transfer of heat from the welding area to the surrounding area. This insulating effect eliminates the necessity of using a heat distributing member, such as a copper chill, to distribute the intense localized heat over a larger area.

The backing strip 1 may be employed with equal success if the lips 8 are of an appreciable thickness, as shown in the drawing, or if they have a feather edge. In addition, lips 8 may either be in tight engagement or separated with a substantial gap therebetween. In either case the underbead will be formed with the desired convexity and smoothness.

The present invention provides an inexpensive backing strip which may be used with either automatic or hand welding. The backing strip may be applied to curved surfaces as well as flat surfaces and will remain an integral structure throughout welding so that the strip will be readily removed as one piece after welding.

Various modes of carrying out the invention are contemplated as within the scope of the following claims particularly pointing out and distinctly claiming the subject matter which is regarded as the invention.

We claim:

1. A back-up strip to be applied to the underside of a seam between the aligned opposed edges of two metal articles to be welded, which comprises a band of ceramic material having a supporting surface to support and form the molten weld metal, a wire mesh embedded in said ceramic material and extending co-extensively therewith, said mesh being disposed a substantial distance from said supporting surface of the ceramic material to prevent melting of the mesh during welding, and said mesh serving to maintain the ceramic in intimate contact with the weld metal until the weld metal has solidified and cooled, and means for removably securing said ceramic material to the underside of said metal articles in alignment with the opposed edges between said articles.

2. A welding back-up apparatus to be applied to the underside of a seam between opposed circular edges of two tubular metal articles to be welded together, which comprises a series of independent juxtaposed ceramic segments disposed in a circular arrangement to form a substantially continuous ring, said ring having a supporting surface to receive and form the molten weld metal, an annular metal lattice member interconnecting the ceramic segments and spaced from the supporting surface of said segments, said member serving to maintain alignment of the band with said seam and maintain the strip in an integral form so that the same may be readily removed after the welding operation is completed, and means for securing said ring to the underside of said metal articles with said ring being disposed in alignment with the opposed edges to be welded.

3. A welding back-up strip to be applied to the underside of a seam between the opposed edges of two metal parts to be welded together, comprising a band of ceramic material having a supporting surface to support and form the molten weld metal, a metal lattice member embedded in said band and extending co-extensively therewith, said member having a generally flat base portion and a pair of side walls extending generally perpendicularly to said base portion, said side walls projecting outwardly beyond the supporting surface of said band and being adapted to bear against the respective articles on either side of said seam to space the supporting surface of said band from said articles, and means for removably securing said ceramic material to the underside of said metal articles in alignment with the opposed edges between said articles.

4. A welding back-up apparatus to be applied to the underside of a seam between the opposed edges of two metal articles to be welded together, which comprises a perforated metal trough having a base and side walls and having an open top, a high melting point ceramic material disposed within the trough and distributed within the perforations of said trough to form an integral strip, said ceramic material having a supporting surface adapted to support and form the molten weld metal during welding of said edges, and means for removably securing said strip in alignment with said seam during welding of said edges.

5. A method of backing up the underside of a seam between the opposed edges of two metal articles to be welded together in preparation for welding, which comprises extruding a molten ceramic material onto a band of wire mesh with the ceramic material penetrating the openings of the wire mesh to produce an integral strip on solidifying of the ceramic, baking the strip at an elevated temperature to drive off the moisture contained in the ceramic, breaking the ceramic material at predetermined positions throughout its length, bending the strip to the general contour of the underside of the seam between the opposed edges of the articles to be welded, and removably positioning the strip in alignment with said seam with the ceramic material being disposed to support and form the molten weld metal during welding of said seam.

6. A method of backing up the underside of a seam between the opposed edges of two metal articles to be welded together, which comprises applying a molten high melting point ceramic material to a band of perforated metal having a bottom portion and side walls, distributing the ceramic within the perforations of said band to produce an integral strip having a metal backing and a ceramic supporting surface with the side walls of the band projecting outwardly beyond said supporting surface, engaging the projecting side walls with the underside of the articles to space the supporting surface in welding alignment beneath the seam, and removably securing said strip in alignment with the seam between the opposed edges of the articles with the strip supporting and forming the molten weld metal during welding of said seam.

7. A method of backing-up the underside of a seam between the opposed edges of two metal articles to be welded together in preparation for welding, comprising depositing a molten ceramic material onto a band of wire mesh with the ceramic material penetrating the openings of the wire mesh, solidifying the ceramic material to produce an integral strip, breaking the ceramic material at spaced locations throughout its length, bending the strip to the general contour of the underside of the seam between the opposed edges of the articles to be welded, and removably positioning the strip in alignment with said seam with the ceramic material being disposed to support and form the molten weld metal during welding of said seam.

References Cited in the file of this patent

UNITED STATES PATENTS

| | | | |
|---|---|---|---|
| 773,305 | Wadsworth | Oct. 25, | 1904 |
| 954,956 | Guyaux | Apr. 12, | 1910 |
| 1,072,021 | McLaughlin | Sept. 2, | 1913 |
| 1,902,051 | Wall | Mar. 21, | 1933 |
| 2,301,062 | Long | Nov. 3, | 1942 |
| 2,362,505 | Smith | Nov. 14, | 1944 |
| 2,673,916 | Meyer | Mar. 30, | 1954 |
| 2,820,427 | Chyle et al. | Jan. 21, | 1958 |

FOREIGN PATENTS

| | | |
|---|---|---|
| 12,339 | Great Britain | 1915 |
| 355,904 | Germany | July 7, 1922 |